US012803940B2

(12) United States Patent
Kamyshev

(10) Patent No.: US 12,803,940 B2
(45) Date of Patent: Nov. 17, 2026

(54) SYSTEM AND METHODS FOR ALTERING CHAT LAYOUT BASED ON CONTENT

(71) Applicant: RingCentral, Inc., Belmont, CA (US)

(72) Inventor: Igor Kamyshev, Valencia (ES)

(73) Assignee: RingCentral, Belmont, CA (US)

( * ) Notice: Subject to any disclaimer, the term of this patent is extended or adjusted under 35 U.S.C. 154(b) by 159 days.

(21) Appl. No.: 18/758,616

(22) Filed: Jun. 28, 2024

(65) Prior Publication Data

US 2026/0005994 A1 Jan. 1, 2026

(51) Int. Cl.

| | |
|---|---|
| ***H04L 51/08*** | (2022.01) |
| ***G06F 3/0484*** | (2022.01) |
| ***H04L 51/18*** | (2022.01) |

(52) U.S. Cl.

CPC ............ *H04L 51/08* (2013.01); *G06F 3/0484* (2013.01); *H04L 51/18* (2013.01)

(58) Field of Classification Search

CPC ........ H04L 51/08; H04L 51/18; G06F 3/0484

See application file for complete search history.

(56) References Cited

U.S. PATENT DOCUMENTS

| | | | | |
|---|---|---|---|---|
| 6,557,027 B1 * | 4/2003 | Cragun | .................. H04L 51/04 | 719/329 |
| 11,782,575 B2 * | 10/2023 | Devine | ............... G06V 40/172 | 715/810 |
| 2016/0202889 A1 * | 7/2016 | Shin | ...................... G06F 3/0488 | 715/758 |

* cited by examiner

*Primary Examiner* — Haoshian Shih

(57) ABSTRACT

The present disclosure relates to systems and methods for changing the Graphical User Interface (GUI) of a chat based on the content shared in the chat. According to one embodiment, a computer-implemented method for changing a GUI of a chat window in a collaboration environment is proposed. The method comprises the steps of: receiving a message shared by a participant of a chat; detecting that the message comprises a type of attachment; and applying a layout to the chat window based on the type of attachment.

17 Claims, 11 Drawing Sheets

SYSTEM AND METHODS FOR ALTERING CHAT LAYOUT BASED ON CONTENT

TECHNICAL FIELD

The present disclosure relates generally to the field of collaboration environments. Specifically, the present disclosure relates to systems and methods for changing the Graphical User Interface (GUI) of a chat based on the content shared in the chat.

BACKGROUND

Collaboration environments have become an integral part of modern society, with millions of people using them every day to communicate and collaborate. In the age of social media and instant messaging, these virtual spaces offer a unique opportunity for individuals and businesses to connect, share ideas, and build relationships from anywhere in the world. Besides that, collaboration environments such as online chats provide a sense of community and belongingness, online chats are also important in that they facilitate learning and knowledge-sharing. Given the availability of sharing content other than just text messages, people are more and more engaged in using online chat as a point of exchanging various types of electronic content. Some people may use a group chat for exchanging photos or videos from joint vacation, others may use a workgroup chat for exchanging parts of a code for a project they are working on. However, sharing various different types of content via online chats may be inefficient and even cumbersome because user may have to click on attachments, other links, or navigate to the chat menu in order to retrieve the desired content.

SUMMARY

The appended claims may serve as a summary of the invention.

DETAILED DESCRIPTION

Figure 1:
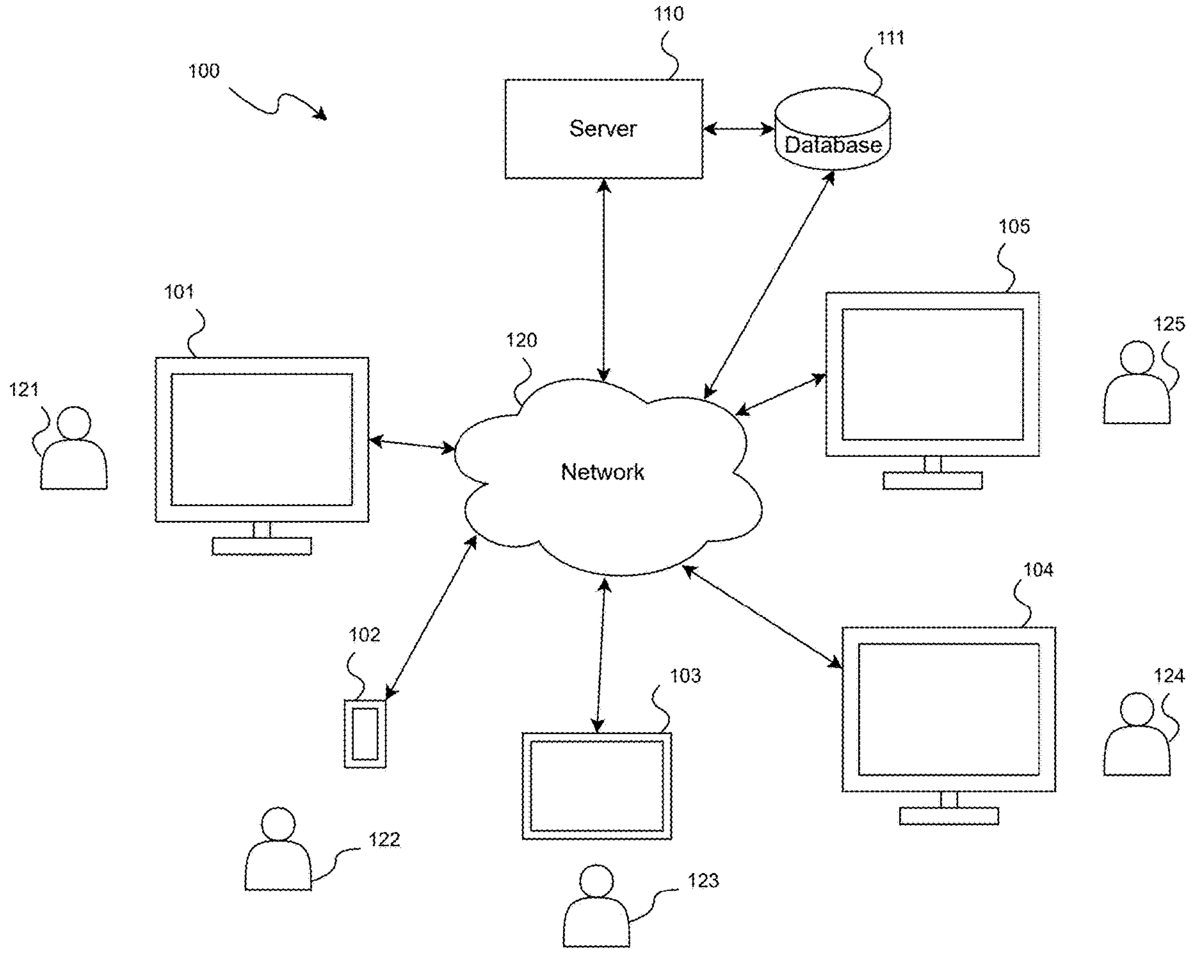
FIG. 1 is a diagram of a communication system, according to an example embodiment of the present disclosure.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing" "forming" "detecting" "processing," "updating" "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood that terms "user" and "participant" have equal meaning in the following description.

Embodiments are described in sections according to the following outline:

1.0 GENERAL OVERVIEW
2.0 STRUCTURAL OVERVIEW
3.0 FUNCTIONAL OVERVIEW
4.0 PROCEDURAL OVERVIEW

1.0 General Overview

The current disclosure provides a technological solution to the technological problem of inefficient usage of collaboration environment networks and servers. Essentially, the most common GUI used to represent a chat window consists of a thread of messages, a keyboard (for the sensor displays) and a few extra controls. The thread of messages usually covers almost the entire GUI of the chat window. In cases when the user wants to see the shared content of the chat, the user may need to scroll through the messages in the thread until the desired content is found within the thread. Additionally, the GUI for the chat window may include additional chat function controls which allow users to access the shared content within a separate tab from the chat window (e.g. a "content tab"). However, having an exclusive content tab may cause issues as the user may need to see the comments/messages sent along with the content, which makes the user go to the chat window back again. In the instance, when the user needs to find a few items, this set of actions will be repeated over and over for each of the items. This non-seamless process requires the user to jump from window to window back and forth, creating a bad user experience in the first place, but more importantly, every switching of the windows will require the user device to request the list of chats and the list of content from the server of collaboration environment every time user changes the windows. Thus, there is a need to create a seamless process of searching and representing the content and the messages in the chat window in collaboration environments improving the effectiveness of communications between user devices and servers.

The current solution solves these problems by providing an efficient technical solution for automatically changing the layout of the GUI of a chat window in a collaboration environment by analyzing the context surrounding the shared content and adjusting the GUI based on the shared content. In one aspect of the present disclosure, a computer-implemented method for changing a GUI of a chat window in a collaboration environment is proposed. The method comprises the steps of: receiving a message shared by a participant of a chat; detecting that the message comprises a type of attachment; and applying a layout to the chat window based on the type of attachment. Therefore, the current solution provides the technological benefit of creating a seamless experience for chatting within the collaboration environment as well as reducing the number of transactions exchanged between a user device and a server.

In one embodiment of the present disclosure, the method comprises causing to display the messages in the layout of the chat window to a user.

In another embodiment of the present disclosure, the method comprises setting a threshold percentage of a number of messages comprising the type of attachment; and wherein applying the layout occurs when a percentage of the number of messages exceeds the threshold percentage.

In another embodiment of the present disclosure, the method comprises detecting a degree of essentiality of text of the message with regard to the attachment; and upon determining that the degree of essentiality of text exceeds a predetermined threshold, displaying the text of the message in the layout of the chat window based on the degree of essentiality.

In another embodiment of the present disclosure, the type of attachment comprises: an audio file, a video file, a picture, a link, a text file, or a code part.

In another embodiment of the present disclosure, the layout comprises: a playlist view, a gallery view, a text viewer view, or a syntax highlighter view.

In yet another embodiment of the present disclosure, the method comprises receiving a second message shared by the participant of the chat; detecting that the second message comprises a second type of attachment, wherein the second type of attachment is different from the type of attached in the message; incorporating the second type of attachment into the layout; and causing to display the layout of the chat window with the second type of attachment to a user.

2.0 Structural Overview

FIG. 1 shows a diagram of a communication system suitable for realization of one of the embodiments of a collaboration environment of the current disclosure.

The communication system 100 facilitates communications between user devices 101, 102, 103, 104, and 105, each associated with corresponding user 121, 122, 123, 124 and 125, a collaboration server 110, and a database 111. Network 120 may be any type of network that provides communications or facilitates the exchange of information between the collaboration server 110 and user devices 101, 102, 103, 104, and 105. For example, network 120 broadly represents one or more local area networks (LANs), wide area networks (WANs), metropolitan area networks (MANs), global interconnected internetworks, such as the public internet, or other suitable connection(s) or combination thereof that enables communication system 100 to send and receive information between the user devices 101, 102, 103, 104, and 105 and the collaboration server 110. Each such network 120 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 120 and the disclosure presumes that all elements of FIG. 1 are communicatively coupled via network 120. A network may support a variety of electronic messaging formats, and may further support a variety of services and applications for user devices 101, 102, 103, 104, and 105.

In particular, user devices may be a desktop user device 101, 104 and 105 executing any known operational environment, e.g., Windows®, MacOS®, Linux® or Unix®. At the same time, other user devices may be mobile telephones, such as smartphone devices, e.g., user device 102, or tablets, e.g., user device 103, executing any of the known operational environments, e.g., Android® or iOS.

In accordance with the present disclosure, user devices 101, 102, 103, 104 and 105 may exchange messages and share content with each other via network 120. In an embodiment, collaboration server 110 may also facilitate exchanging messages and sharing content between users 122, 122, 123, 124 and 125.

The database 111 may store the exchanged messages and shared content and provide access to the exchanged messages and shared content. Alternatively, the database 111 may facilitate storing and accessing the exchanged messages and shared content. In particular example, the database 111 may store information on where the exchanged messages and shared content could be accessed.

Figure 2:
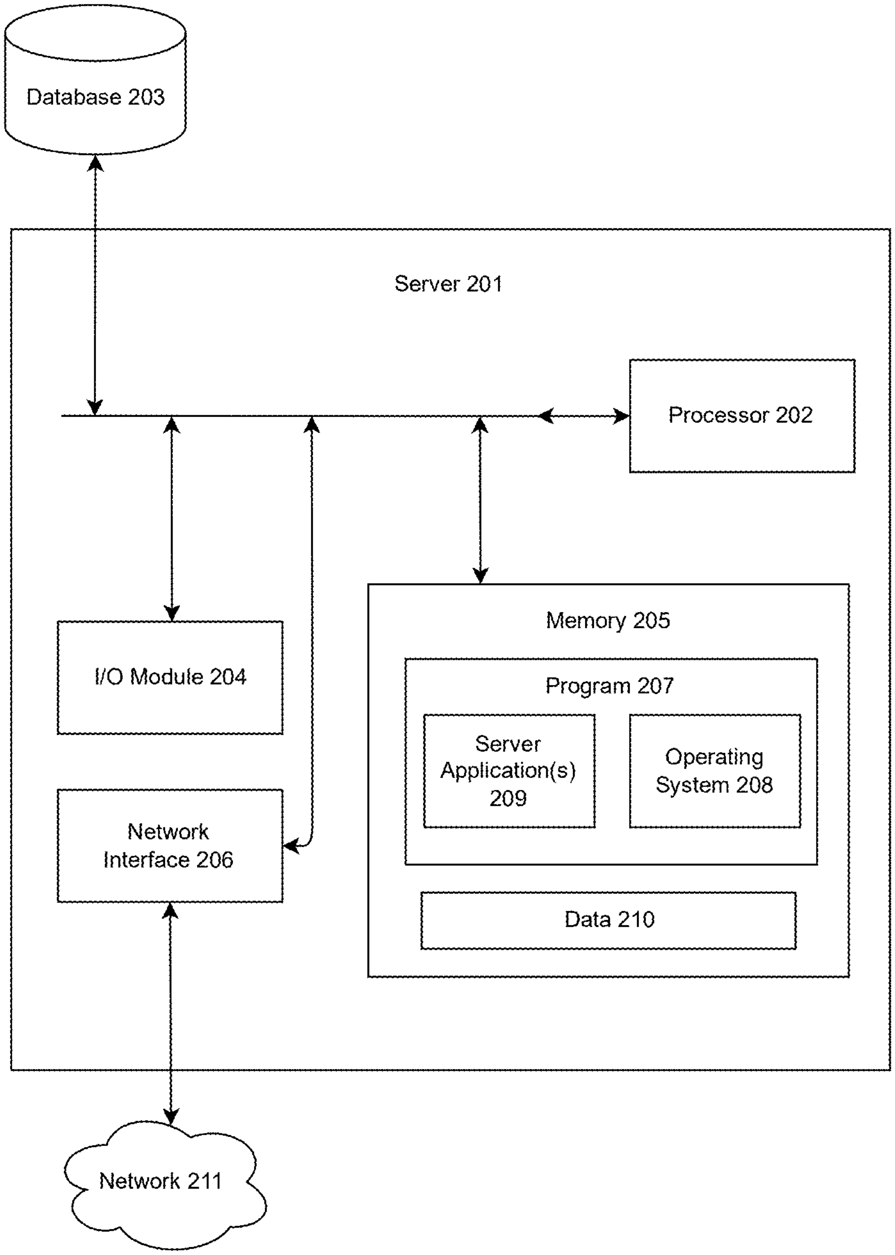
FIG. 2 is a diagram of a server, according to an example embodiment of the present disclosure.

FIG. 2 is a block diagram that illustrates an example of a server 201 suitable for implementing the disclosed systems and methods. The server 201 may represent the collaboration server 110 of FIG. 1. The server 201 may include at least one processor, e.g., processor 202. The processor 202 may be operably connected to one or more databases (e.g., database 203), an input/output (I/O) module 204, memory 205, and network interface device 206.

I/O module 204 may be operably connected to a keyboard, mouse, touch screen controller, and/or other input controller(s) (not shown). Other input/control devices connected to I/O module 204 may include one or more touchpads, trackballs, buttons, rocker switches, thumb-wheel, infrared port, USB port, and/or a pointer device such as a stylus.

Processor 202 may also be operably connected to memory 205. Memory 205 may include high-speed random access memory and/or non-volatile memory, such as one or more magnetic disk storage devices, one or more optical storage devices, and/or flash memory (e.g., using NAND, NOR gates).

Memory 205 may include one or more programs 207. For example, memory 205 may store an operating system 208, such as DARWIN, RTXC, Linux®, iOS, Unix®, OS X, Windows®, or an embedded operating system such as VXWorks®. Operating system 208 may include instructions for handling basic system services and for performing hardware dependent tasks. In some implementations, operating system 208 may comprise a kernel (e.g., UNIX kernel).

Memory 205 may also store one or more server applications 209 to facilitate communicating with one or more additional devices, one or more computers and/or one or more servers. Server applications 209 may also include instructions to execute one or more of the disclosed methods.

Memory 205 may also store data 210. Data 210 may include transitory data used during instruction execution. Data 210 may also include data recorded for long-term storage.

Each of the above identified instructions and applications may correspond to a set of instructions for performing one or more functions described above. These instructions need not be implemented as separate software programs, procedures, or modules. Memory 205 may include additional instructions or fewer instructions. Furthermore, various functions of server 201 may be implemented in hardware and/or in software, including in one or more signal processing and/or application specific integrated circuits.

Communication functions may be facilitated through one or more network interfaces (e.g., network interface 206). Network interface 206 may be configured for communications over Ethernet, radio frequency, and/or optical (e.g., infrared) frequencies. The specific design and implementation of network interface 206 depends on the communication network(s) over which server 201 is intended to operate. For example, in some embodiments, server 201 includes wireless/wired network interface 206 designed to operate over a GSM network, a GPRS network, an EDGE network, a Wi-Fi® or WiMax® network, and a Bluetooth® network. In other embodiments, server 201 includes wireless/wired network interface 206 designed to operate over a TCP/IP network. Accordingly, network 211 (e.g, the network 120 of FIG. 1) may be any appropriate computer network compatible with network interface 206.

The various components in server 201 may be coupled by one or more communication buses or signal lines (not shown).

Figure 3:
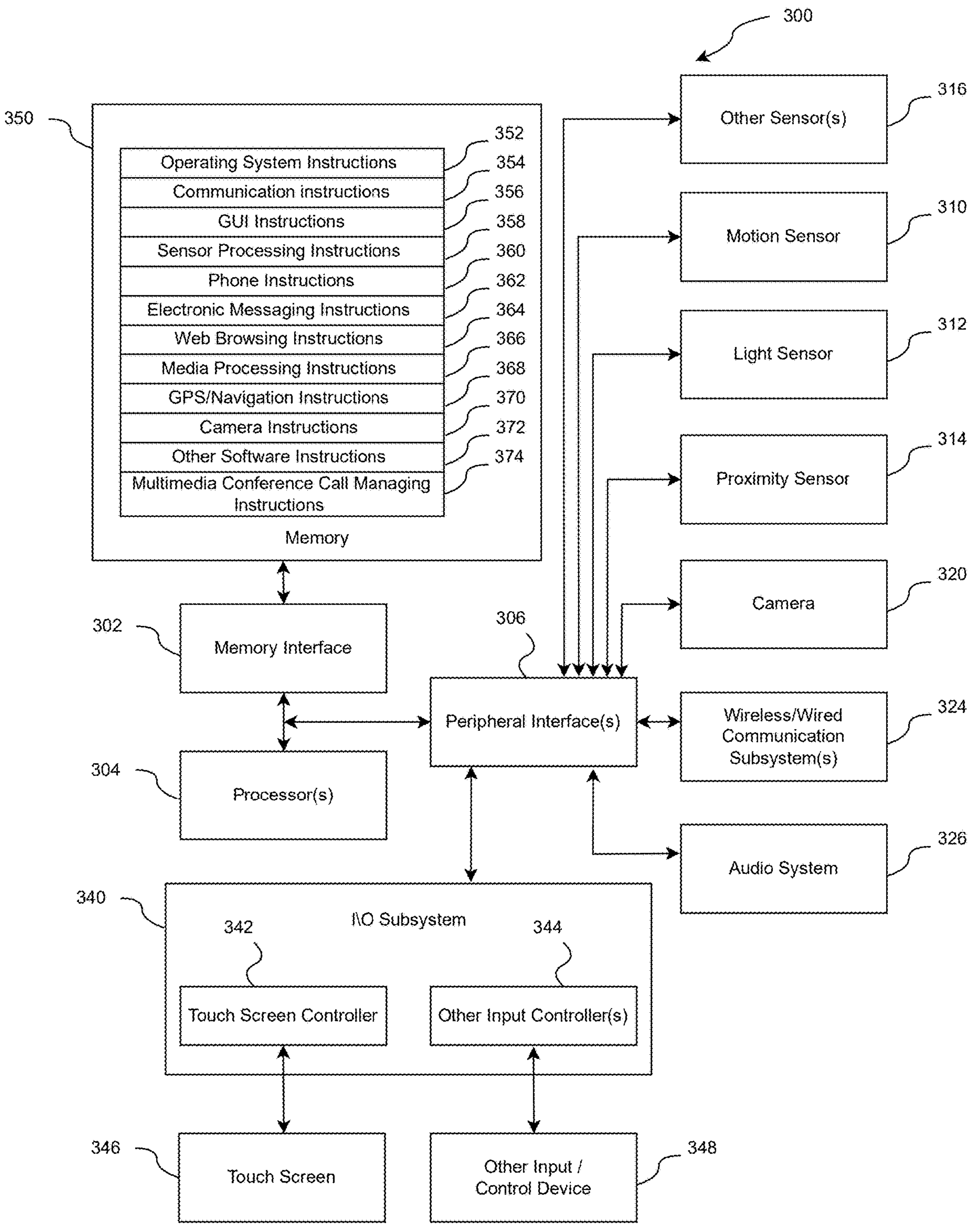
FIG. 3 is a diagram of a user device, according to an example embodiment of the present disclosure.

FIG. 3 is a diagram of an example of a user device 300 for use in a communication system, such as communication system 100. The user device 300 can be used to implement computer programs, applications, methods, processes, or other software to perform embodiments described in the present disclosure, such as the user devices 102, 104, 106, and 108. The user device 300 includes a memory interface 302, a peripheral interface 306, one or more processors 304 such as data processors, image processors and/or central processing units, and a peripheral interface 306. The memory interface 302, the one or more processors 304, and/or the peripheral interface 306 can be separate components or can be integrated in one or more integrated circuits. The various components in the user device 300 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 206 to facilitate orientation, lighting, and proximity functions. Other sensors 316 can also be connected to the peripherals interface 306, such as a positioning system (e.g., GPS receiver), a temperature sensor, a biometric sensor, or other sensing device, to facilitate related functionalities. A GPS receiver can be integrated with, or connected to, the user device 300. For example, a GPS receiver can be built into mobile telephones, such as smartphone devices, e.g., user device 104, or into laptop, e.g., user device 106. GPS software allows mobile telephones to use an internal or external GPS receiver (e.g., connecting via a serial port or Bluetooth®). A camera 320 and an optical sensor 322, e.g., a charged coupled device ("CCD") or a complementary metal-oxide semiconductor ("CMOS") optical sensor, may be utilized to facilitate camera functions, such as recording photographs and video clips.

Communication functions may be facilitated through one or more wireless/wired communication subsystems 324, which includes an Ethernet port, radio frequency receivers and transmitters and/or optical (e.g., infrared) receivers and transmitters. The specific design and implementation of the wireless/wired communication subsystem 324 depends on the communication network(s) over which the user device 300 is intended to operate. For example, in some embodiments, the user device 300 includes wireless/wired communication subsystems 324 designed to operate over a GSM network, a GPRS network, an EDGE network, a Wi-Fi® or WiMax® network, and a Bluetooth® network.

An audio system 326 may be used to facilitate voice-enabled functions, such as voice recognition, voice replication, digital recording, and telephony functions.

The I/O subsystem 340 includes a touch screen controller 342 and/or other input controller(s) 344. The touch screen controller 342 is coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346. While a touch screen 346 is shown in FIG. 3, the I/O subsystem 340 may include a display screen (e.g., CRT or LCD) in place of the touch screen 346.

The other input controller(s) 344 is coupled to other input/control devices 348, such as one or more buttons, rocker switches, thumb-wheel, infrared port, USB port, and/or a pointer device such as a stylus. The touch screen 346 can, for example, also be used to implement virtual or soft buttons and/or a keyboard.

The memory interface 302 is coupled to memory 350. The memory 350 includes high-speed random access memory and/or non-volatile memory, such as one or more magnetic disk storage devices, one or more optical storage devices, and/or flash memory (e.g., NAND, NOR). The memory 350 stores an operating system 352, such as DARWIN, RTXC, Linux®, iOS, Unix®, OS X, Windows®, or an embedded operating system such as VXWorks®. The operating system 352 can include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 can include graphical user interface instructions to facilitate graphic user interface processing; sensor processing instructions to facilitate sensor-related processing and functions; phone instructions to facilitate phone-related processes and functions; electronic messaging instructions to facilitate electronic-messaging related processes and functions; web browsing instructions to facilitate web browsing-related processes and functions; media processing instructions to facilitate media processing-related processes and functions; GPS/navigation instructions to facilitate GPS and navigation-related processes and instructions; camera instructions to facilitate camera-related processes and functions; and/or other software instructions to facilitate other processes and functions. The memory 350 may also include messaging instructions to facilitate messaging-related processes and instructions.

In some embodiments, the communication instructions 354 represent or include software applications to facilitate connection with the collaboration server 112 of FIG. 1 that connects a plurality of user devices. The electronic messaging instructions 362 may include a software program to generate communication requests to the collaboration server 112 for carrying out communications. Further, the electronic messaging instructions 362 may include software applications to receive communication requests from the collaboration server 112. The graphical user interface instructions 356 may include a software program that facilitates display of the communication notifications to a user associated with the user device and facilitates the user to provide user input, and so on.

In the presently described embodiment, the instructions cause the processor 304 to perform one or more functions of the disclosed methods. For example, the instructions may cause the displaying of notifications, the sending of information to the server 201 of FIG. 2 or the receiving of information from the server 201.

Each of the above identified instructions and software applications may correspond to a set of instructions for performing one or more functions described above. These instructions may be implemented as separate software programs, procedures, or modules. The memory 350 may include additional instructions or fewer instructions. Furthermore, various functions of the user device 300 may be implemented in hardware and/or in software, including in one or more signal processing and/or application specific integrated circuits.

The user device 300 of FIG. 3 or the user devices 101, 102, 103, 104, and 105 of FIG. 1 may execute various applications stored in memory 350. For the sake of the present disclosure, the memory 350 of the user device 300 may store a collaboration application of a collaboration platform which, when executed by the processor 202, instructs the user device to communicate with the collaboration server 110 or other user devices 101, 102, 103, 104, and 105 of via the network 120 of FIG. 1. In an embodiment, the conferencing application may be a browser-based application being part of the collaboration platform. In another embodiment, the collaboration application may be an application that uses Web Real-Time Communication (WebRTC).

Additionally, the memory 350 of the user device may store an application facilitating the exchange of messages and sharing content between users on an example of the communication system 100 of FIG. 1. In a particular implementation, memory 350 may store a mailing application, e.g., Slack®, Telegram® or similar application enabling users to send messages and share content.

3.0 Functional Overview

Figure 4:
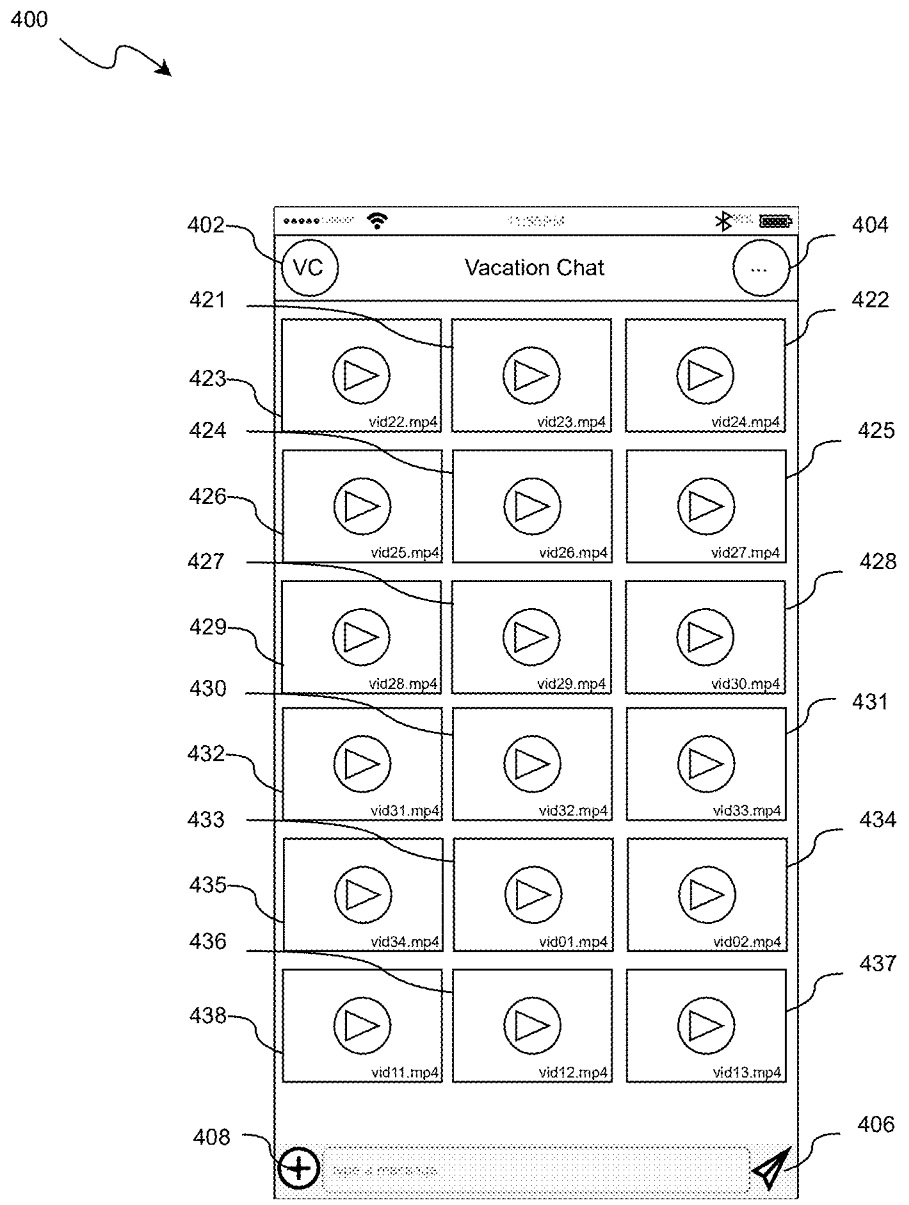
FIG. 4 is an example GUI, according to an example embodiment of the present disclosure.

FIG. 4 depicts an example GUI 400 in accordance with the present disclosure. GUI 400 may be a part of the GUI displayed on a user device (such as user device 101-105 of FIG. 1 or the user device 300 of FIG. 3) and represent a collaboration environment realized on a communication system (such as collaborating system 100 of FIG. 1). In particular, GUI 400 represents a chat window where users can send messages using the send control 406, or share content using the share content control 408. However, at the same time, the GUI 400 represents a list of content of the chat including content items 421-438. Upon receiving the content items 421-438, the server 110 may detect that users exchange only content of a particular type in the chat and do not exchange any text messages in the chat. Based on that, the communication system may change the chat layout to the view mostly suitable for the detected type of content. In the particular example of the GUI 400, the processor 202 of the server 201 detected that the users exchanged video files in the chat. Since the most suitable and dense way to view a list of video files and search through it is a gallery view, the processor 202 changes the chat layout to a gallery view as depicted in FIG. 400. Due to that change, the user upon opening the chat in the collaborating environment instantly sees the list of the shared content.

It should be appreciated that the gallery view is a non-limiting example of the chat layout. For example, users may share audio files, video files, pictures, links, text files, or code parts, etc. In another embodiment, if the users share pictures in the chat, the processor may change the chat layout to a picture gallery view. In another embodiment, if the users share audio files in the chat, the processor may change the chat layout to a playlist view. In another embodiment, if the users share long text or text files in the chat, the processor may change the chat layout to a text viewer view. In yet another embodiment, if the users share parts of the programming code in the chat, the processor may change the chat layout to a syntax highlighter view.

It should be appreciated that the term layout is used in the present disclosure as a nonlimiting term. The layout may define the size of the item in the GUI, as well as the relative positions of the items. Additionally, layout may define the data that is rendered in the chat with regard to each item. In a particular example, in a playlist view, the duration of each audio file, name of the artist, name of the composition, and album cover may be rendered.

Figure 5:
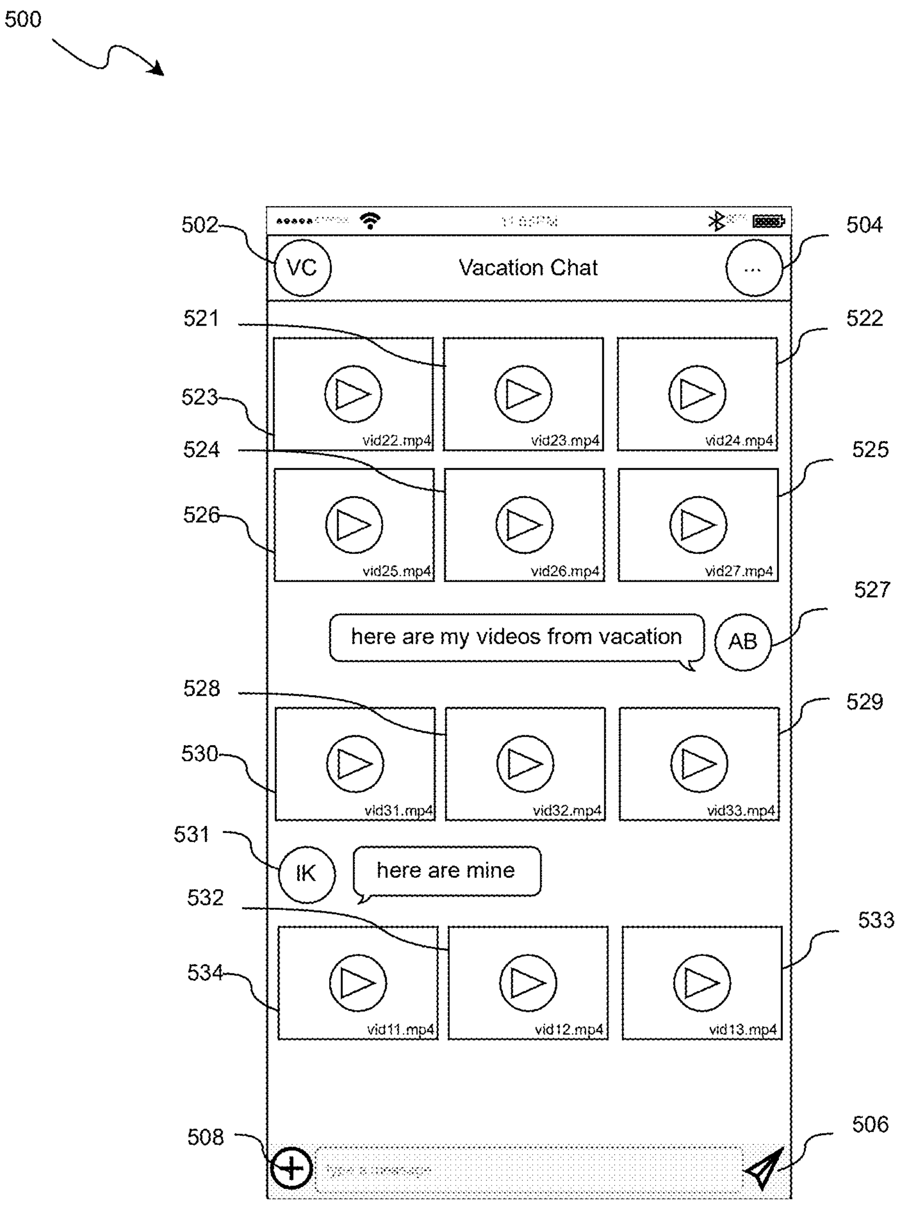
FIG. 5 is an example GUI, according to an example embodiment of the present disclosure.

FIG. 5 depicts an example GUI 500 in accordance with the present disclosure. GUI 500 may be a part of the GUI displayed on a user device (such as user device 101-105 of FIG. 1 or the user device 300 of FIG. 3) and represent a collaboration environment realized on a communication system (such as collaborating system 100 of FIG. 1). In this embodiment, the processor 202 of the server 201 detected that the users exchanged video files (the content items 521-526, 528-530 and 532-534) in the chat. At the same time, the processor 202 detected that users were exchanging the messages "here are my videos from vacation" and "here are mine" 531 depicted in message bubbles 525 and 531 in between the content items. The processor 202 may analyze the messages exchanged in the chat and represent the messages along with the content within the selected chat layout based on the analysis. Here, the messages bubbles 527 and 531 are rendered in between the content items 521-526, 528-530, and 532-534, and incorporated such that each message bubble occupies the whole line of the gallery view.

In an example embodiment, the processor may detect that the number of messages is not sufficient, and the messages could be incorporated into the chosen chat layout without distracting the user from searching for content items. In particular, the number of messages could be less than the predetermined percent threshold of the overall sent items including messages and content items, e.g., 2% of the sent items, or less than 2 messages per 10 content items in a row. In other embodiments, the processor 202 may analyze a number of words/symbols of the messages to determine if the message will distract the users from searching the shared content in the chat. For example, if a message comprises less than 20 symbols, the processor may incorporate the message into the chosen chat layout.

In the other embodiment, in case when the users share audio files in the chat and the processor changes the chat layout to a playlist view, the exchanged message may be incorporated into the playlist view occupying a line of the playlist (or one track of the playlist).

In the other embodiment, in case when the users share long text in the chat and the processor changes the chat layout to a text viewer view, the exchanged message may be incorporated into the text viewer view as a marginal note, a header, or a footer of a page.

In the other embodiment, in case when the users share parts of the programming code in the chat and the processor changes the chat layout to a syntax highlighter view, the exchanged message may be incorporated into the syntax highlighter view as a regular comment to code with corresponding highlighting or designators, e.g., "--" for SQL, "<!--", "-->" for XML or "//" for JavaScript.

Figure 6:
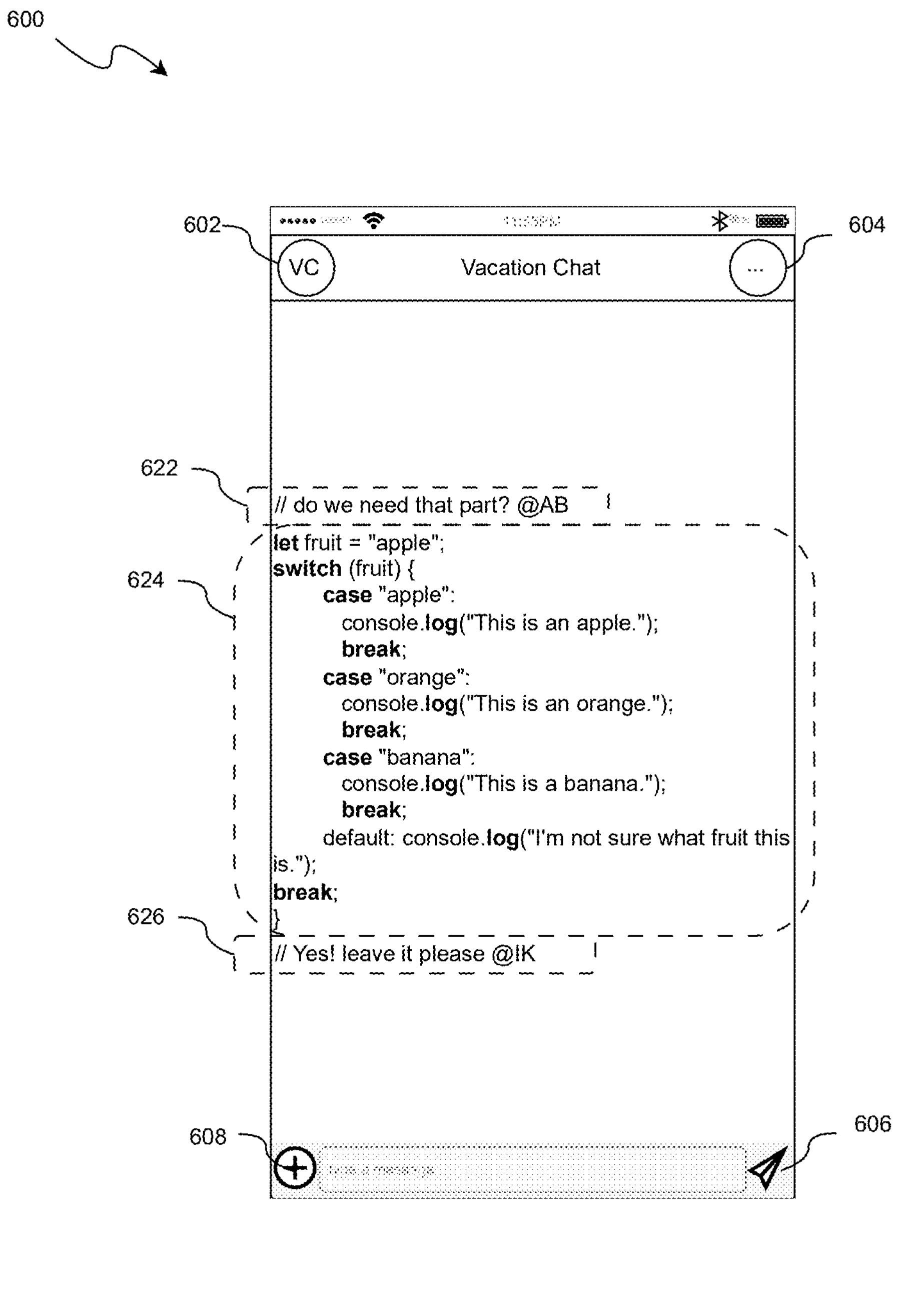
FIG. 6 is an example GUI, according to an example embodiment of the present disclosure.

FIG. 6 depicts an example GUI 600 in accordance with the present disclosure. GUI 600 may be a part of the GUI displayed on a user device (such as user device 101-105 of FIG. 1 or the user device 300 of FIG. 3) and represent a collaboration environment realized on a communication system (such as collaborating system 100 of FIG. 1). In this embodiment, the processor 202 of the server 201 detected that the users exchanged the code parts and changed the chat layout to a syntax highlighter view. In particular, the processor 202 may detect that the text message sent to the chat contains part of the code or the complete code. In the example, embodiment of FIG. 6, the processor 202 may detect that the code 624 was written using JavaScript and apply the corresponding syntax highlighter view to the entire chat layout. Additionally, the users exchanged messages 622 and 626 in the chat that was not part of the code. The text of the messages 622 and 626 may be analyzed by processor 202, and processor 202 may detected that the text has a contextual connection to the code 624. In other words, the processor 202 may detect that the code 624 cannot be posted in the chat without the messages 622 and 624, and, vice-versa, the messages 622 and 624 cannot be posted in the chat without the code 624. Since the processor 202 applied the syntax highlighter view for JavaScript, the processor 202 may incorporate the messages 622 and 624 with the corresponding designators "//" and indication of the senders "@AB" and "@IK". In JavaScript the designator "//" means that the following line of the text is a comment and should be omitted by the compiler while executing the code. This measure in the chat may be beneficial for the developers, in case they accidentally copy messages with the shared content.

Figure 7:
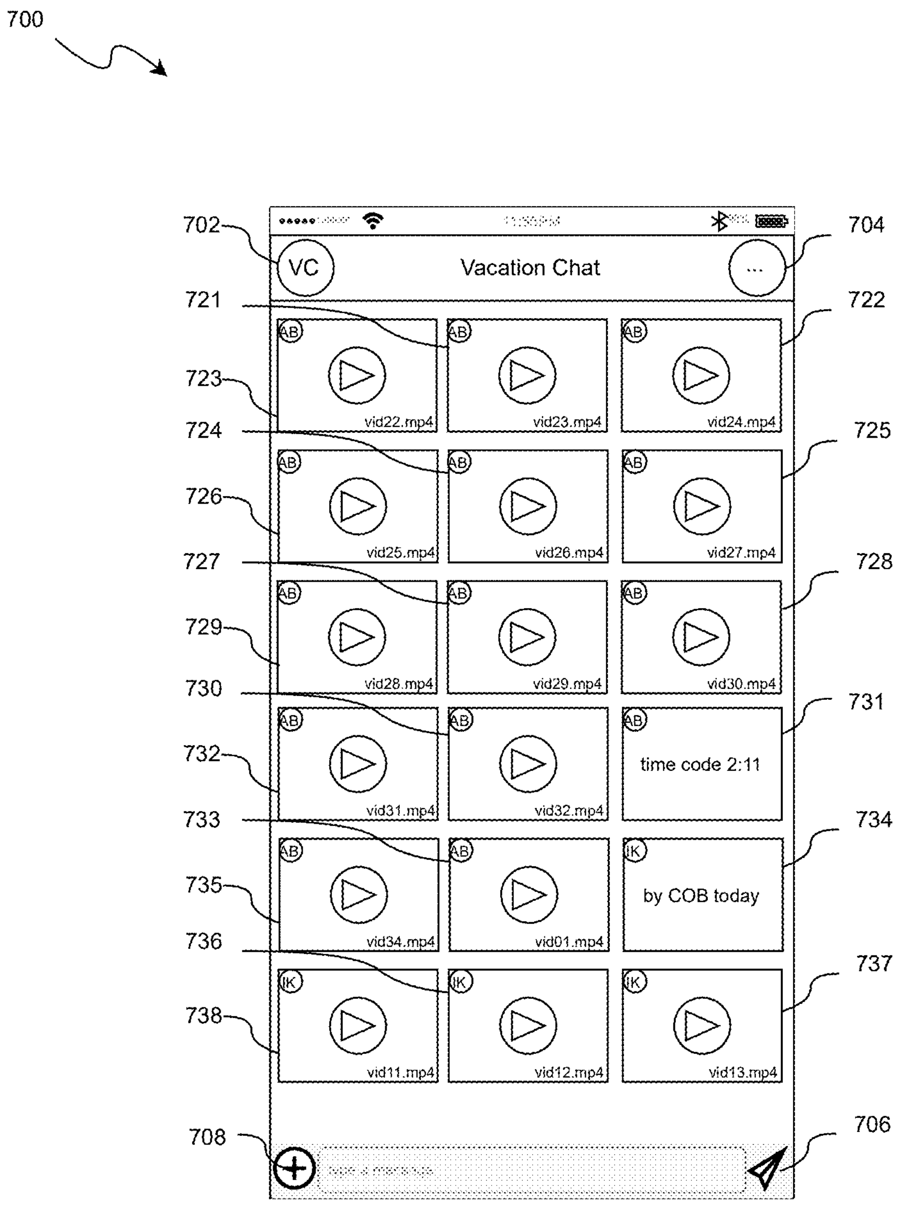
FIG. 7 is another example GUI, according to an example embodiment of the present disclosure.

FIG. 7 depicts an example GUI 700 in accordance with the present disclosure. Similar to the GUI 600, GUI 700 may be a part of the GUI displayed on a user device (such as user device 101-105 of FIG. 1 or the user device 300 of FIG. 3) and represent a collaboration environment realized on a communication system (such as collaborating system 100 of FIG. 1). The processor 202 of the server 201 detected that the users exchanged video files along with the messages. In this embodiment, the messages 731 and 734 are rendered in between the content items 721-730, 732-733, and 735-738, and incorporated such that each message occupies one tile of the gallery view. In an example embodiment, the processor 202 may detect keywords characterizing the content item (like message "time code 2:11" 831) or keywords indicating urgency (like message "by COB today" 834).

In another embodiment, the processor 202 may detect different keywords/phrases that are contextually connected with the shared content. In particular example, the message "person on the right is Ken" exchanged along with a photo or video may be considered as contextually connected with the shared content. In another example, time code shared with video files may be considered as contextually connected with the shared content. In yet another example, the urgency indicators, e.g., "urgent", "quick" or "right now", may be considered as contextually connected with the shared content.

Figure 8:
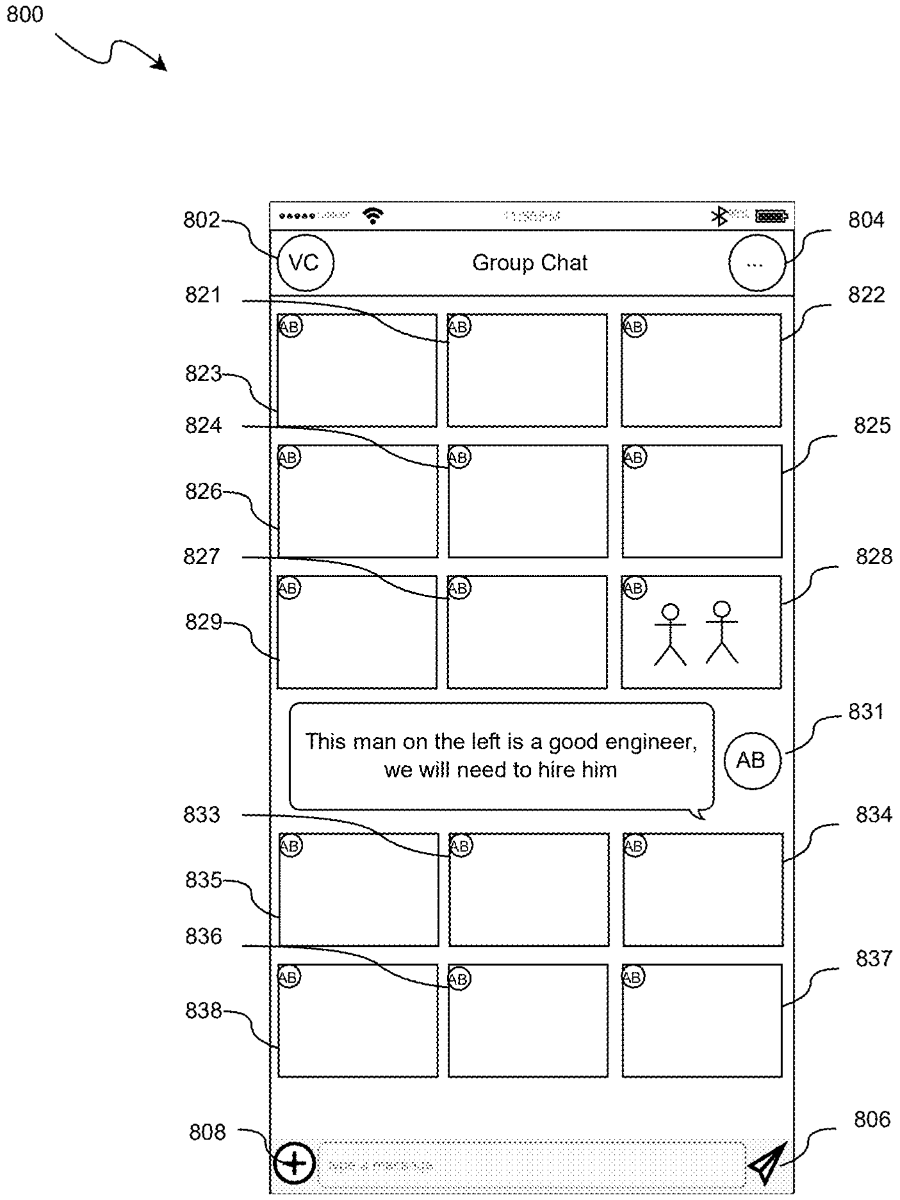
FIG. 8 is yet another example GUI, according to an example embodiment of the present disclosure.

FIG. 8 depicts an example GUI 800 in accordance with the present disclosure. Similar to the GUI 700, GUI 800 may be a part of the GUI displayed on a user device (such as user device 101-105 of FIG. 1 or the user device 300 of FIG. 3) and represent a collaboration environment realized on a communication system (such as collaborating system 100 of FIG. 1). The processor 202 of the server 201 detected that the users exchanged photos and changed the chat layout to the gallery view. Additionally, the users exchanged messages in the chat. In the example of FIG. 8, the users may exchange a lot of messages along with the photos, like reactions (e.g., "nice", "wow", etc.) and comments (e.g., "fun outlook", "great sunset", etc.). Besides that, the user AB sent the message "This man on the left is a good engineer, we will need to hire him" as a comment on photo 828. The processor 202 may analyze the photo 828 and the message and detect that the photo and the message are linked with contextual connection. In the example of GUI 800, the processor detects that the photo contains two persons and the message contains text concerning one of the persons of the photo: " . . . this man on the left . . . ". In response to this detection, the processor 202 incorporates the message in the gallery view with the message bubble 831.

Figure 9:
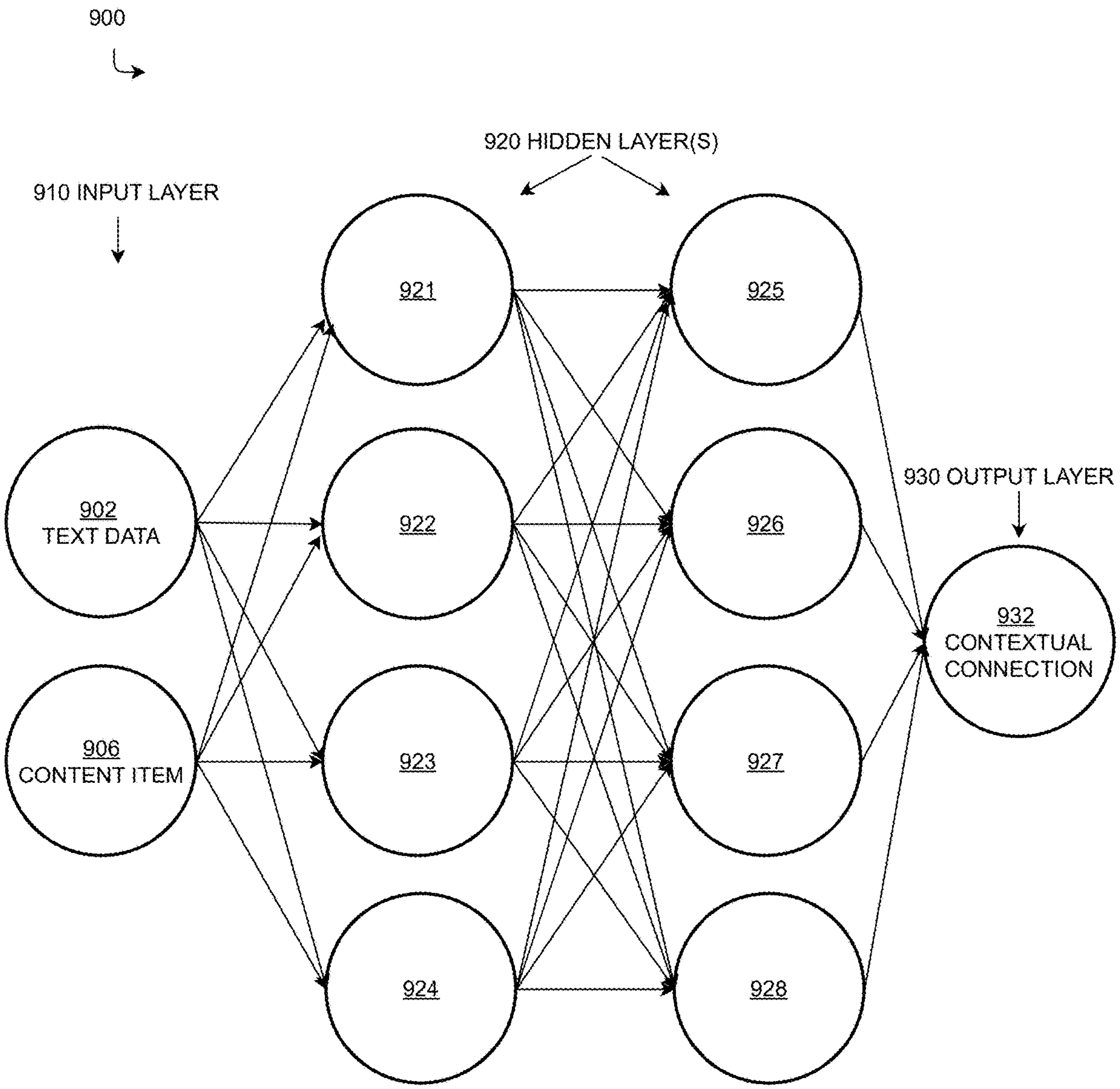
FIG. 9 is an example ML architecture, according to an example embodiment of the present disclosure.

In an embodiment, machine learning may be used to process the message or the content item. Referring to FIG. 9, a neural network 900 may utilize an input layer 910, one or more hidden layers 920, and an output layer 930 to train a machine learning algorithm or model to define the contextual connections between messages and content items. In some embodiments, where the contextual connections are identified, supervised learning is used such that known input data, a weighted matrix, and know output data is used to gradually adjust the model to accurately compute the already known output. In other embodiments, where the contextual connections are not identified, unstructured learning is used such that a model attempts to reconstruct known input data over time in order to learn.

Training of the neural network 900 using one or more training input matrices, a weight matrix and one or more known outputs may be initiated by one or more external computers associated with the collaboration environment. For example, the neural network 900 may be trained by one or more training computers and, once trained, used in association with the server 110 and/or user interface devices 101, 102, 103, 104 or 105 to identify the contextual connections between messages and content items. In an embodiment, a computing device may run known input data through a deep neural network 900 in an attempt to compute a particular known output. For example, a server computing device uses a first training input matrix and a default weight matrix to compute an output. If the output of the deep neural network does not match the corresponding known output of the first training input matrix, the server adjusts the weight matrix, such as by using stochastic gradient descent, to slowly adjust the weight matrix over time. The server then re-computes another output from the deep neural network with the input training matrix and the adjusted weight matrix. This process continues until the computer output matches the corresponding known output. The server then repeats this process for each training input dataset until a fully trained model is generated.

In the example of FIG. 9, the input layer 910 includes a plurality of training datasets that are stored as a plurality of training input matrices in an associated database, such as database 111 of FIG. 1. The training input data includes, for example, text data 902 of a message. While the example of FIG. 9 uses a single neural network for both text data 902 of message and content item 904, in some embodiments, one neural network 900 would be used to train a textual model for identifying the context of the message while another neural network 900 would be used to train multimodal model for identifying the context of the content item. Any number of neural networks may be used to train the module.

In the embodiment of FIG. 9, hidden layers 920 represent various computational nodes 921, 922, 923, 924, 925, 926, 927, and 928. The lines between each node 921, 922, 923, 924, 925, 926, 927, and 928 represent weighted relationships based on the weight matrix. As discussed above, the weight of each line is adjusted over time as the model is trained. While the embodiment of FIG. 9 features two hidden layers 920, the number of hidden layers is not intended to be limiting. For example, one hidden layer, three hidden layers, ten hidden layers, or any other number of hidden layers may be used for a standard or deep neural network. The example of FIG. 9 also features an output layer 930 with the contextual connection 932 as the known output. The contextual connection 932 might be represented as a number indicating the percentage of the contextual connection between the text of the message and the content item. As discussed above, in this structured model, the contextual connection 932 is used as a target output for continuously adjusting the weighted relationships of the model. When the model successfully outputs the contextual connection 932, then the model has been trained and may be used to process live or field data.

Once the module is trained by the neural network 900 of FIG. 9, the trained module will accept field data at the input layer 910, such as messages from a user of real chat. In some embodiments, the field data is live data that is accumulated in real-time, such as chat messages of live chat and shared content. In other embodiments, the field data may be data that has been saved in an associated database, such as database 111. The trained module is applied to the field data in order to identify one or more contextual connections at the output layer 930. For instance, a trained module can identify the contextual connection between the messages and the shared content of the chat where users exchange messages on different topics and share different types of content.

It should be appreciated that the term contextual connections is used here as a non-limiting term. The trained ML model may be used to identify a level of essentiality or relevance of the text of the message with regard to the content shared in the chat.

It should be appreciated that similar machine learning method could be used to define key words, key phrases and key sentences of the text of the messages. Further, machine learning methods could be used for processing audio data of audio or video files and visual data of pictures or video files.

4.0 Procedural Overview

Figure 10:
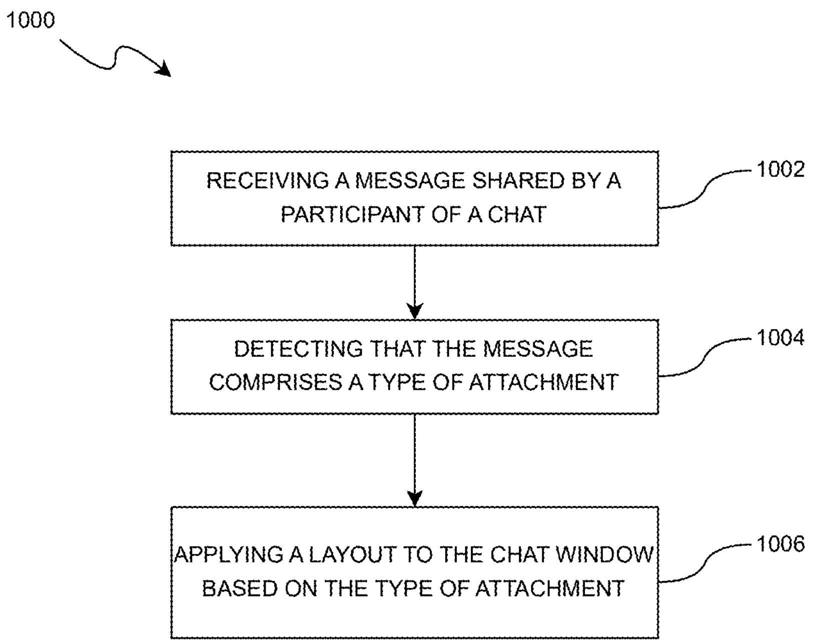
FIG. 10 is a flowchart of an example method for changing a GUI of a chat window, according to one example embodiment of the present disclosure.

FIG. 10 shows a flowchart of an example method 1000 for changing the GUI of a chat window. The method 1000 may be implemented using general-purpose computer including processor 202 of the server 201 or processor 304 of the user device 300.

At step 1002, the processor receives a message shared by a participant of a chat. For example, the user may send a text message in the group chat with colleagues or friends. The participant may utilize a user device, like the user device 101 to send the message to the group chat. The group chat may be a part of the collaborating environment connecting a set of servers and other user devices. As disclosed above, the processor may be the processor 202 of the server 201. In this embodiment, the processor 202 receives the message sent by the user device 300 to the server. In another embodiment, the processor may be the processor 304 of the user device 300, and the message may be sent by the other user device participating in the chat. In yet another embodiment, the processor may be the processor 304 of the user device 300 that sends the message to the chat. In this embodiment, the processor may receive the message at the moment the user uses the send control 606 to send the message to the chat. In another embodiment, the processor 304 of the user device 300 may receive the message once the user opens the chat window.

At step 1004, the processor detects that the message includes a type of attachment. The processor 202 of the server 201 detects the content that is being sent along with the message. For example, a user may decide to share a video file, picture, part of the code, text file or audio file. The processor may detect the type of content based on the filename extension. For example, the processor may detect that the user sends a video file based on its extensions .mp4, .mov, wmv, .avi and so on. The processor may detect that the user sends an audio file based on its extensions .wav, .ape, mp3, .flac and so on. The processor may detect that the user sends a text file based on its extensions .txt, .doc, bat, and so on. The processor may detect that the user sends a picture file based on its extensions .png, .jpeg, gif, .raw, and so on. In another embodiment, the processor may detect the type of the attachment using different encoding techniques.

At step 1006, the processor applies a layout to the chat window based on the type of the attachment. The processor 202 may apply the layout or instruct other processors to apply the type of GUI. For example, the processor 202 may send instructions to a user device (like the user device 101). The instructions may include a pre-determined template of the chat layout to be used for rendering the chat window on the user device. The instructions may instruct the processor 304 of the user device to apply a chat layout that is stored in the memory of the user device (like the GUI instructions 356 of the user device 300). In particular example, when the processor detects (at step 1004) that the type of attachment is pictures, the processor 202 instructs the user device to apply a gallery view to the chat window. In another example, the users may exchange different types of attachments. The processor 202 may apply the chosen chat layout based on the majority of the attachments, e.g., when users exchange a lot of photos and share single audio file only once. The processor 202 may omit this single shared audio file from the chat layout. In another example, the processor 202 may apply the chosen chat layout based on the number of recently shared content items, e.g. the last 20 shared content items were photos, so the processor 202 applies a gallery view.

Figure 11:
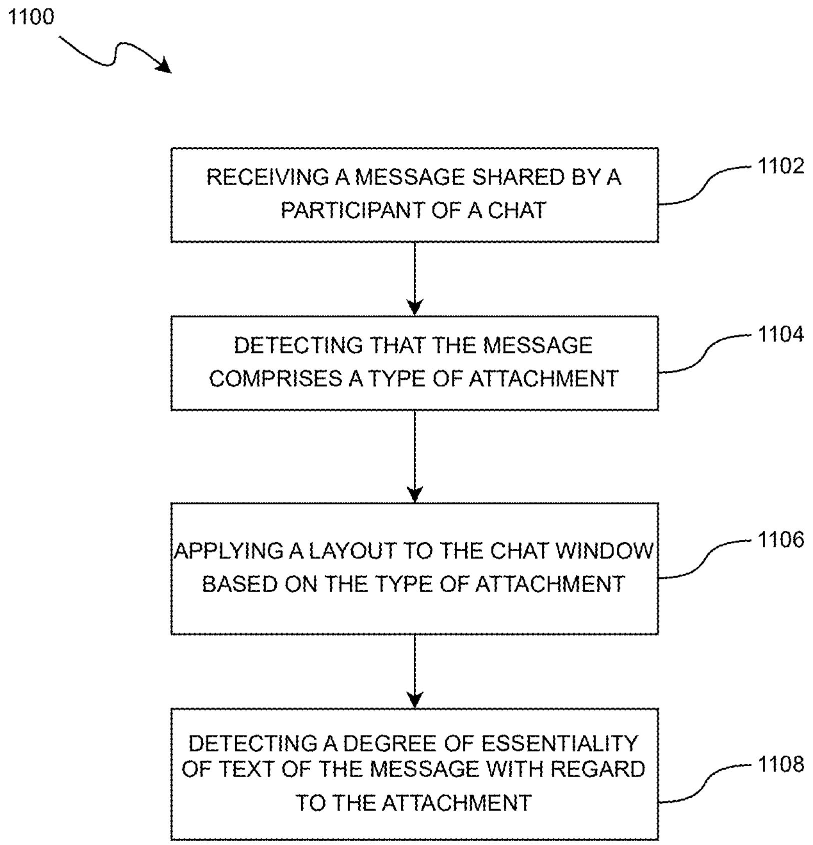
FIG. 11 is a flowchart of another example method for changing a GUI of a chat window, according to another example embodiment of the present disclosure.

FIG. 11 shows a flowchart of example method 1100 for changing GUI of a chat window. The method 1100 may be implemented using general-purpose computer including processor 202 of the server 201 or processor 304 of the user device 300.

At step 1102, the processor receives a message shared by a participant of a chat. The step may be carried out the same way as it is described above with regard to step 1002 of the method 1000.

At step 1104, the processor detects that the message comprises a type of attachment. The step may be carried out the same way as it is described above with regard to step 1004 of the method 1000.

At step 1106, the processor applies a layout to the chat window based on the type of the attachment. The step may be carried out the same way as it is described above with regard to step 1006 of the method 1000.

At step 1108, the processor detects a degree of essentiality of the text of the message with regard to the attachment. The processor 202 may use one or more ML techniques disclosed above. For example, the processor 202 may run the trained model according to an embodiment of FIG. 9 to evaluate the contextual connection between text of the message and the attachment. In an embodiment, if the trained model outputs a high level of relevance between the text and the attachment, the processor 202 may be instructed to incorporate the text of the message into the chosen chat layout. Referring back to the example embodiment of FIG. 8, the processor 202 may use the trained model to detect the contextual connection between the photo 828 and the message rendered in the message bubble 831. Alternatively, if the trained model outputs a low level of relevance, the processor 202 may instruct to leave the chosen chat layout untouched and render only the attachments. Referring to the example embodiment of FIG. 4, the processor 202 may use the trained model to detect the contextual connection between the shared content items 421-438 and the messages exchanged in the chat, and upon detecting of no contextual connection between the content items and the messages, render only content items without messages.

In a particular example, the processor 202 may analyze only the text of a single message against only the last attachment in the chat. And, vice-versa, the processor 202 may use texts of all messages sent in the chat against a single attachment. In another embodiment, the processor may analyze a random number of text messages against a random number of the attachments.

It should be appreciated that the order of steps is not the only correct one. In different embodiments some steps can be excluded from the sequence, some steps can be executed in a different sequence. In some embodiments, steps of applying a layout and detecting a degree of essentiality may be performed concurrently. For example, the step of detecting the type of the attachment and applying a layout may be carried out in advance before receiving a message, and the processor 202 only detects the degree of essentiality of the text of the message to the attachments that have been shared before.

What is claimed is:

1. A computer-implemented method for changing a Graphical User Interface (GUI) of a chat window in a collaboration environment, the method comprising:

receiving a message shared by a participant of a chat;

detecting that the message comprises a type of attachment;

setting a threshold percentage of a number of messages comprising the type of attachment; and applying a layout to the chat window based on the type of attachment when a percentage of the number of messages exceeds the threshold percentage.

2. The computer-implemented method of claim 1, further comprising causing to display the message in the layout of the chat window to a user.

3. The computer-implemented method of claim 1, further comprising:

detecting a degree of essentiality of text of the message with regard to the attachment; and upon determining that the degree of essentiality of text exceeds a predetermined threshold, displaying the text of the message in the layout of the chat window based on the degree of essentiality.

4. The computer-implemented method of claim 1, wherein the type of attachment comprises: an audio file, a video file, a picture, a link, a text file, or a code part.

5. The computer-implemented method of claim 1, wherein the layout comprises: a playlist view, a gallery view, a text viewer view, or a syntax highlighter view.

6. The computer-implemented method of claim 1, further comprising the steps of:

receiving a second message shared by the participant of the chat;

detecting that the second message comprises a second type of attachment, wherein the second type of attachment is different from the type of attached in the message;

incorporating the second type of attachment into the layout; and causing to display the layout of the chat window, with the second type of attachment to a user.

7. A non-transitory, computer-readable medium storing a set of instructions that, when executed by a processor, cause:

receiving a message shared by a participant of a chat;

detecting that the message comprises a type of attachment;

setting a threshold percentage of a number of messages comprising the type of attachment; and applying a layout to the chat window based on the type of attachment when a percentage of the number of messages exceeds the threshold percentage.

8. The non-transitory, computer-readable medium of claim 7, wherein the instructions further comprise causing to display the message in the layout of the chat window to a user.

9. The non-transitory, computer-readable medium of claim 7, wherein the instructions further comprise:

detecting a degree of essentiality of text of the message with regard to the attachment; and upon determining that the degree of essentiality of text exceeds a predetermined threshold, displaying the text of the message in the layout of the chat window based on the degree of essentiality.

10. The non-transitory, computer-readable medium of claim 7, wherein the type of attachment comprises: an audio file, a video file, a picture, a link, a text file, or a code part.

11. The non-transitory, computer-readable medium of claim 7, wherein the layout comprises: a playlist, a gallery, a text viewer, or a syntax highlighter.

12. The non-transitory, computer-readable medium of claim 7, wherein the instructions further comprise:

receiving a second message shared by the participant of the chat;

detecting that the second message comprises a second type of attachment, wherein the second type of attachment is different from the type of attached in the message;

incorporating the second type of attachment into the layout; and causing to display the layout of the chat window, with the second type of attachment to a user.

13. A system for changing a Graphical User Interface (GUI) of a chat window in a collaboration environment, the system comprising:

a processor;

a memory operatively connected to the processor and storing instructions that, when executed by the processor, cause:

receiving a message shared by a participant of a chat;

detecting that the message comprises a type of attachment;

setting a threshold percentage of a number of messages comprising the type of attachment; and applying a layout to the chat window based on the type of attachment when a percentage of the number of messages exceeds the threshold percentage.

14. The system of claim 13, wherein the instructions further comprise causing to display the message in the layout of the chat window to a user.

15. The system of claim 13, wherein the instructions further comprise:

detecting a degree of essentiality of text of the message with regard to the attachment; and upon determining that the degree of essentiality of text exceeds a predetermined threshold, displaying the text of the message in the layout of the chat window based on the degree of essentiality.

16. The system of claim 13, wherein the type of attachment comprises: an audio file, a video file, a picture, a link, a text file, or a code part.

17. The system of claim 13, wherein the layout comprises: a playlist view, a gallery view, a text viewer view, or a syntax highlighter.

* * * * *